United States Patent [19]

Suzuki

[11] Patent Number: 4,575,237
[45] Date of Patent: Mar. 11, 1986

[54] DISTANCE MEASURING DEVICE

[75] Inventor: Kenji Suzuki, Kanagawa, Japan

[73] Assignee: Canon Kabushiki Kaisha, Tokyo, Japan

[21] Appl. No.: 452,076

[22] Filed: Dec. 22, 1982

[30] Foreign Application Priority Data

Dec. 28, 1981 [JP] Japan ................... 56-211333

[51] Int. Cl.$^4$ ................... G01C 3/00; G01C 5/00
[52] U.S. Cl. ................... 356/1; 356/4; 354/403; 250/201
[58] Field of Search .......... 356/1, 375, 400, 4; 354/403; 250/201 PF, 204

[56] References Cited
U.S. PATENT DOCUMENTS

4,274,735 6/1981 Tamura et al. ................... 356/1
4,288,152 9/1981 Matsuda ................... 354/403

Primary Examiner—S. C. Buczinski
Assistant Examiner—Gregory C. Issing
Attorney, Agent, or Firm—Toren, McGeady, Stanger, Goldberg & Kiel

[57] ABSTRACT

In a device which is provided with means for transmitting a signal to an object and an array of a plurality of means for receiving reflection signals from the object and is arranged to measure a distance to the object by processing the signals obtained through the receiving means, the distance to the object is continuously measured through the signals obtained from at least two of the plurality of receiving means.

27 Claims, 9 Drawing Figures

DISTANCE MEASURING DEVICE

BACKGROUND OF THE INVENTION:

1. Field of the Invention:

This invention relates to a distance measuring device arranged to measure a distance to an object by transmitting a signal such as a light to the object and by receiving reflection signals from the object and particularly to a distance measuring device of the light projecting type operating on the principle of triangulation or trigonometrical measurement and having computative processing means such as an electrical circuitry arranged to adequately process analog signals coming from a photometric circuit for distance measurement and to produce a continuous distance detecting signal.

2. Description of the Prior Art:

There have been known distance measuring device of the kind called the triangulation distance measuring type having light beams projecting means and light sensitive elements arranged in a row to receive a light reflected from a distance measuring object and arranged to detect which of the light sensitive elements has received the reflection light by means of a photometric circuit corresponding to these light sensitive elements. Generally, in a distance measuring device of this type, each light sensitive element corresponds to one distance zone. The light receiving signal of each light sensitive element is reduced to presence or absence of the light receiving signal according to a predetermined threshold valve so that a distance zone in which the distance measuring object is located can be determined. For example, in the case of a device represented by FIG. 1 of the accompanying drawings, the device comprises a light source 1 which is a light emitting diode (LED) or the like, a lens 2 for projecting a light beam, an array 3 of three light sensitive elements arranged in a row and a light receiving lens 4. A reference numeral 5 in FIG. 1 indicates an object the distance to which is to be measured. In this device, the three light sensitive elements give three measurable distance zones. In a distance measuring device of this type, the reflection light coming from an object located within the farthest distance zone is extremely weak. In view of this, there has been proposed a method in which such a distance that gives no light receiving signal that reaches the threshold value at any of the light sensitive elements 3a, 3b and 3c is regarded as the farthest distance zone. In accordance with this method, the device shown in FIG. 1 can be arranged to be capable of discriminating four distance zones.

Meanwhile, a Japanese Patent Application Laid-Open No. Sho 56-26212 has disclosed a method. According to this method, in a distance measuring device of the type mentioned above which is arranged to have the light receiving signal of each light sensitive element converted into a binary value representing the presence or absence of the light receiving signal according to the above stated threshold value, if more than two adjoining light sensitive elements detect a reflection light from a distance measuring object, the middle part of the distance zones corresponding to the light receiving signals thus obtained is regarded as a distance zone in which the object is located. According to this method, therefore, it is possible to set additional distance zones in the middle parts between the adjoining distance zones. Then, the above stated distance measuring device of FIG. 1, for example, can be operated as having five distance zones.

In any case, however, in accordance with the conventionally known methods, the number of distinguishable distance zones cannot be increased by more than two times. In cases where precise and elaborate distance measurement with an increased number of distinguishable distance zones is required, the conventional methods necessitates an increase in the number of light sensitive elements. However, in order to increase the number of the light sensitive elements within a distance measuring device in an optical arrangement, the light receiving area of each light sensitive element must be reduced. Then, this results in a decrease in quantity of light incident upon each light sensitive element. This means degradation of the noise resistivity of the distance measuring device. Further, the width of light intensity distribution of light incident upon the array of light sensitive elements is limited by the defocus and aberration of the light beam projecting and light receiving optical systems. Therefore, even when the resolution of the light sensitive element array is enhanced by the increased number of light sensitive elements, the number of distinguishable distance zones does not substantially increase.

SUMMARY OF THE INVENTION

It is an object of the invention to provide a distance measuring device of the light projecting type operating on the principle of triangulation, wherein the light receiving signals of light sensitive elements arrayed in a row are not converted into binary values according to presence or absence of light received, like in the case of the conventional methods, but the distance is detected from quantitative information contained in the light receiving signals, so that the accuracy of distance measurement can be greatly increased.

The above and further objects and features of the invention will become apparent from the following detailed description of preferred embodiments thereof taken in connection with the accompanying drawings.

BRIEF DESCRIPTION OF THE DRAWINGS

FIGS. 2, 3 and 6a/6b are graphs respectively showing light intensity distribution on an array of light sensitive elements.

DESCRIPTION OF THE PREFERRED EMBODIMENTS

Figure 1:
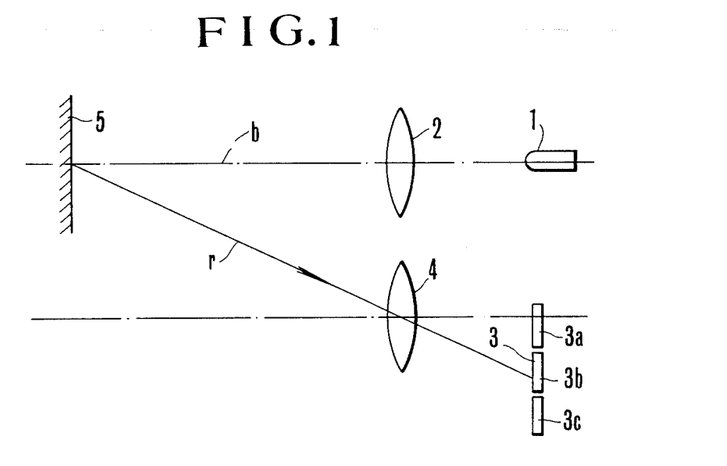
FIG. 1 is a schematic illustration of a distance measuring device of the light projecting type.
Figure 2:
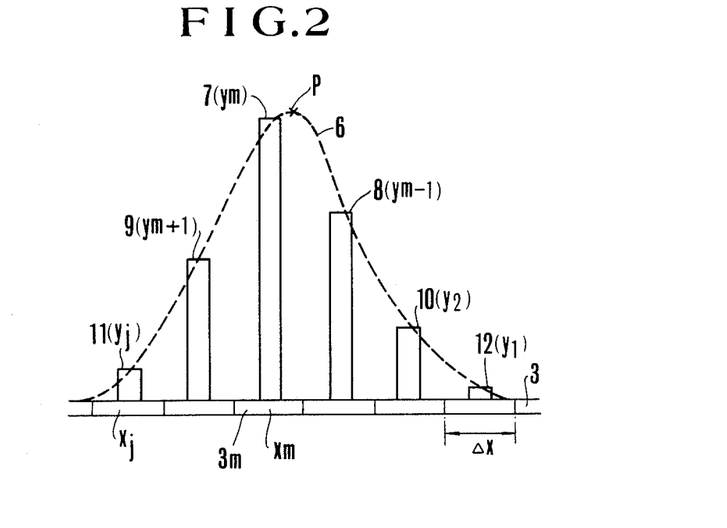

Referring to FIG. 1, details of an embodiment of the present invention are as follows: A reflection light r coming from an object 5 the distance to which is to be measured results, for example, in a light intensity distribution 6 on an array 3 of light sensitive elements as shown in FIG. 2. Then, the distance to the object is considered to be represented by the position of the peak p in the light intensity distribution 6. In FIG. 2, reference numerals 7–12 indicate the light receiving signals of the light sensitive elements. In a conceivable procedure for accurately obtaining the position of the peak p, the light intensity distribution 6 is approximated by a suitable continuous function and then the extreme value p or at least a point in the vicinity thereof is numerically obtained. An example of such a procedure is as follows: Assuming that the position of a light sensitive element located in the j-th position is xj and the light receiving signal thereof is yj, the following relation can be obtained by the method of least square:

$$\phi = \sum_j \{f(a1, a2, \ldots, ak; xj) - yj\}^2 \quad (1)$$

The value $\phi$ is considered a minimum value. In the above formula, the sum can be determined for an element which gives a light receiving signal of a level exceeding a suitably set level. To make $\phi$ the minimum value, parameters a1, a2, ... ak of the function f(x) are obtained as a solution of simultaneous equations:

$$\partial \phi / \partial ai = 0, i = 1, 2, \ldots, k \quad (2)$$

After that, the solution x of $$df/dx = 0 \quad (3)$$

is obtained by an iterative approximation method such as Newton-Raphson method. A satisfactory proximity to the peak position of the light intensity distribution is obtainable through the above stated procedure. Further, it goes without saying that the method for obtaining the solution of the formula (3) is not limited to the above stated method but other methods such as numerical differentiation is also usable. In accordance with this embodiment, the accuracy of distance detection is not restricted by the pitch $\Delta x$ of the array 3 of light sensitive elements. Besides, in cases where the reflection light r from the distance measuring object 5 results in a broad light intensity distribution 6 on the array 3 of light sensitive elements, the embodiment still ensures highly accurate distance detection. The method for obtaining the continuous function f(x) to be used in approximating the light intensity distribution 6 shown in FIG. 2 is of course not limited to the method of least square. Interpolating means for connecting discrete points such as the Lagrange's interpolation formula and series means for expressing by the sum of a continuous function series such as the Forier series are also generally usable for this purpose.

In case where a distance measuring device is to be incorporated in a small portable optical apparatus such as a photographic camera, a device requiring an excessively complex electrical circuit process is not suitable. The embodiment of the invention which will be described hereinafter is therefore arranged to carry out the above stated method with a relatively simple circuit arrangement. Let us assume that the largest of the light receiving signals y1, y2, ... yj, ... is ym when the light intensity distribution 6 of FIG. 2 is obtained on the array 3 of light sensitive elements. Then, if a point in the vicinity of the maximum value of the light intensity distribution 6 is approximated with a quadrate function by using this signal ym and the signals ym−1 and ym+1 on both sides thereof, the position of the extreme value thereof can be expressed by:

$$x = \frac{ym + 1 - ym - 1}{4ym - 2ym - 1 - 2ym + 1} \Delta x + xm \quad (4)$$

wherein xm represents a light sensitive element 3m which produces the above stated largest light receiving signal ym; and $\Delta x$ the pitch at which the array of light sensitive elements are arranged. This pitch can be expressed by:

$$\Delta x = xm + 1 - xm = xm - xm - 1 \quad (5)$$

The computation of the formula (4) above or a formula similar thereto can be easily carried out either in a digital manner or in an analog manner by an electric circuit to be incorporated within a small portable optical apparatus such as a camera.

Figure 3:
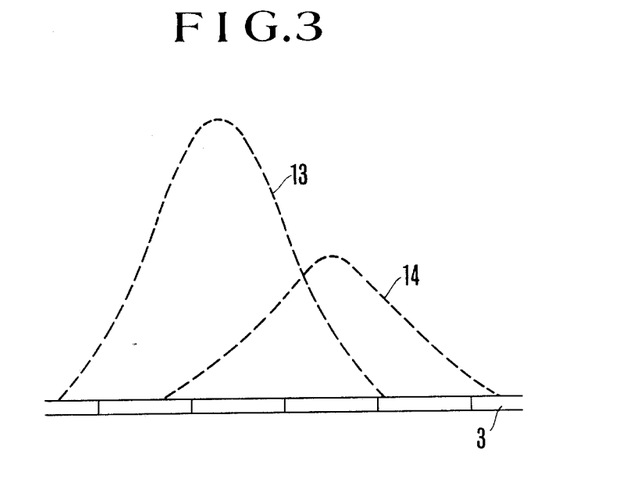

Referring to FIG. 3, with the focus positions and the abberation correcting states of the light beam projecting and light receiving optical systems of the light measuring device set in such a way as to allow light intensity distributions 13 and 14 to have suitable extents of width, a distance measuring device which is capable of performing an extremely accurate operation and has wide distance measurable range using a small number of light sensitive elements can be obtained.

Figure 4:
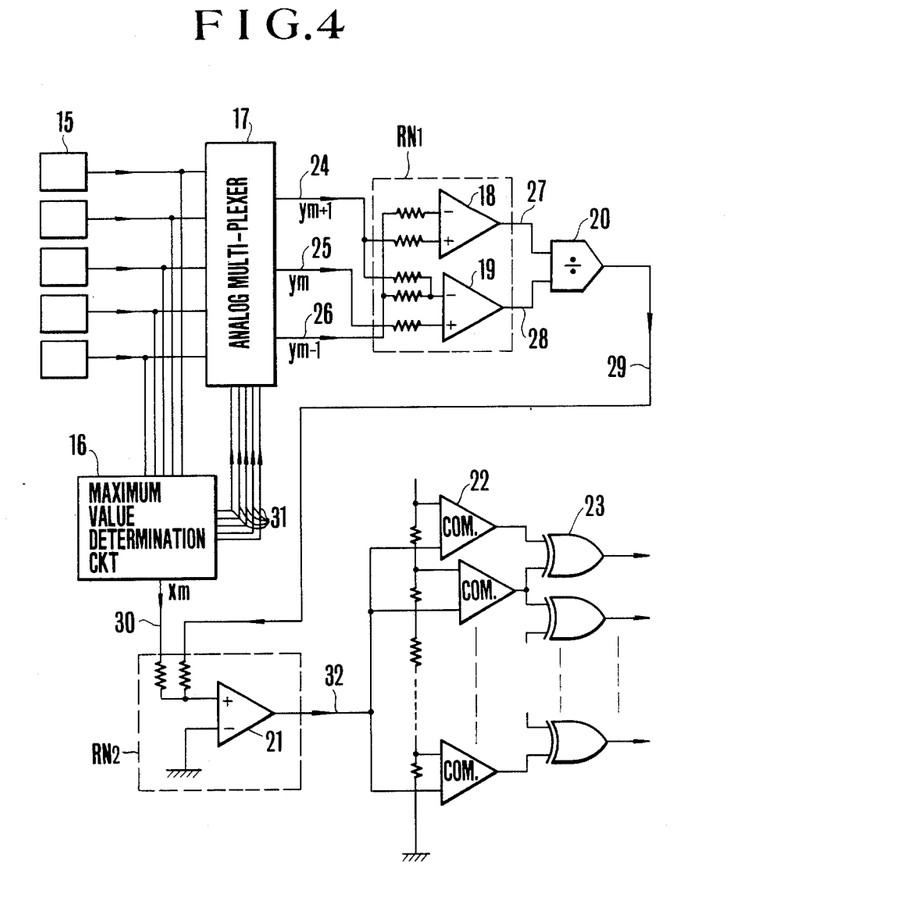
FIG. 4 is a circuit diagram showing a first example of embodiment of the present invention.

An example where an analog computation circuit is used for computation of formula (4) above is as shown in FIG. 4. In this example, the outputs of a light sensitive element array 15 consisting of five elements which are arranged in parallel are supplied in parallel to a maximum value determining circuit 16 and an analog multiplexer 17. The maximum value determining circuit 16 receives the group of analog light receiving signals from the array 15 and discerns the light receiving signal ym which has the largest value among them. Then, circuit 16 produces to a circuit line 31 an address signal determining which of the five light sensitive elements has produced the maximum signal ym and, at the same time, produces to another line 30 an analog voltage corresponding to an address number, i.e. corresponding to xm of the second term of formula (4) above. The analog multiplexer 17 selects the light receiving signal ym of the maximum value and two light receiving signals ym+1 and ym−1 which are adjacent thereto according to the address signal of the line 31 and then produces them one after another to circuit lines 25, 24 and 26 respectively. These signals are added together with predetermined weighting by an addition circuit RN1 which includes operational amplifiers 18 and 19. After the addition, a divider 20 performs a dividing operation. As a result of that, a voltage output which corresponds to the first term of formula (4) appears at a circuit line 29. The pitch $\Delta x$ which is included in the first term of formula (4) appears in a gain within the circuit, such as a gain of the divider 20.

The result thus obtained and the signal of the circuit line 30 which corresponds to the second term of the right-hand side of formula (4) are added together at an addition circuit RN2 including an operational amplifier 21. The result of this addition appears at a circuit line 32 as a measured distance signal. A group of comparators 22 and a group of exclusive OR gates 23 are provided for the purpose of correlating the above stated measured distance signal to a finite zone signal.

Figure 5:
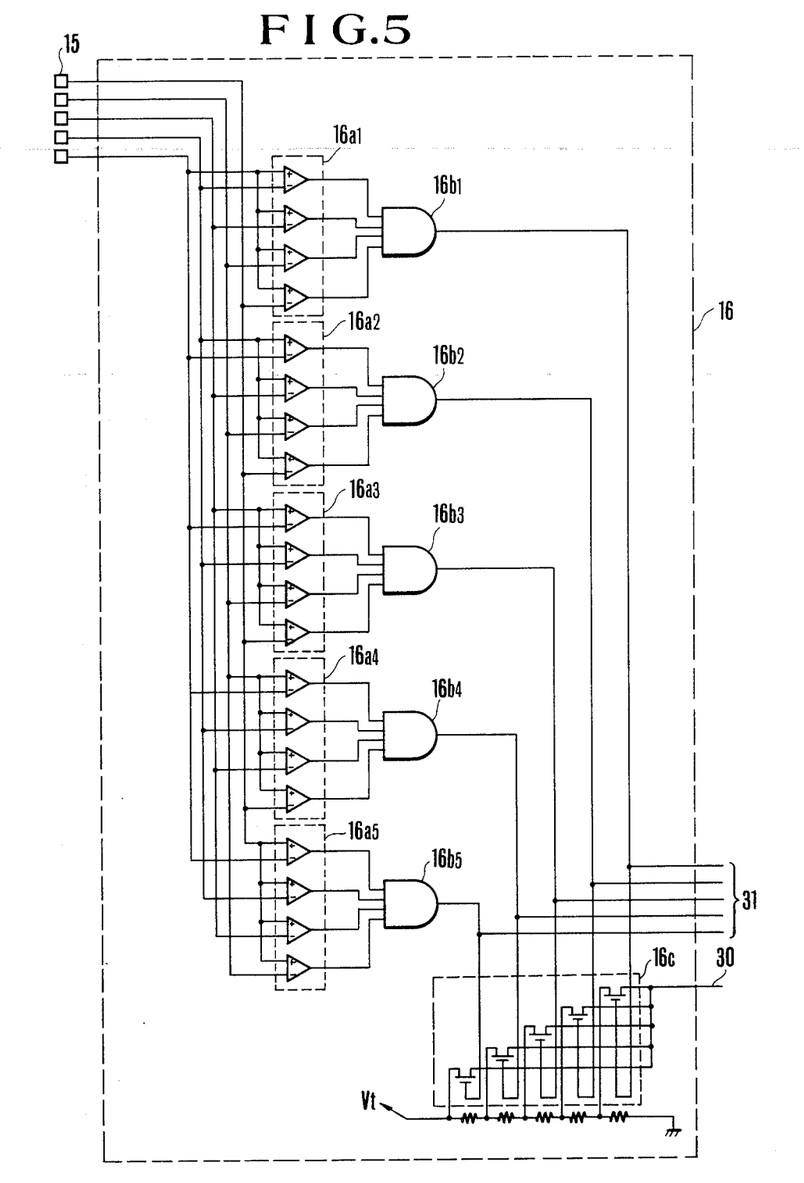
FIG. 5 is a circuit diagram showing the details of a block shown in FIG. 4.

The above stated maximum vlue determining circuit 16 is, for example, arranged such that the signals supplied in parallel from the array 15 of light sensitive elements are compared with each other at each of comparator groups 16a1–16a5 respectively as shown in FIG. 5. The comparator group which detects a signal of the largest value has all the comparators of the group produce high level signals. Therefore, this is detected through AND gates 16b and is produced to the circuit line 31 as the address signal. Then, in response to the address signal, one of analog switch group 16c is operated to produce to the circuit line 30 a position signal xm which represents the position of a light sensitive element that has produced the signal of the largest value, the position signal being produced in the form of an analog voltage.

In the circuit arrangement shown in FIG. 4, the comparator group 22 and the exclusive OR gate group 23 are provided for the purpose of correlating the continuous signal produced at the circuit line 32 to a finite distance zone and therefore are not essential to the present invention. Accordingly, it is possible to use the signal produced at the line 32 as it is and to adjust non-stepwise the position of the phototaking lens. Such arrangement then dispenses with the comparator group 22 and the exclusive OR gate group 23.

Figure 6:
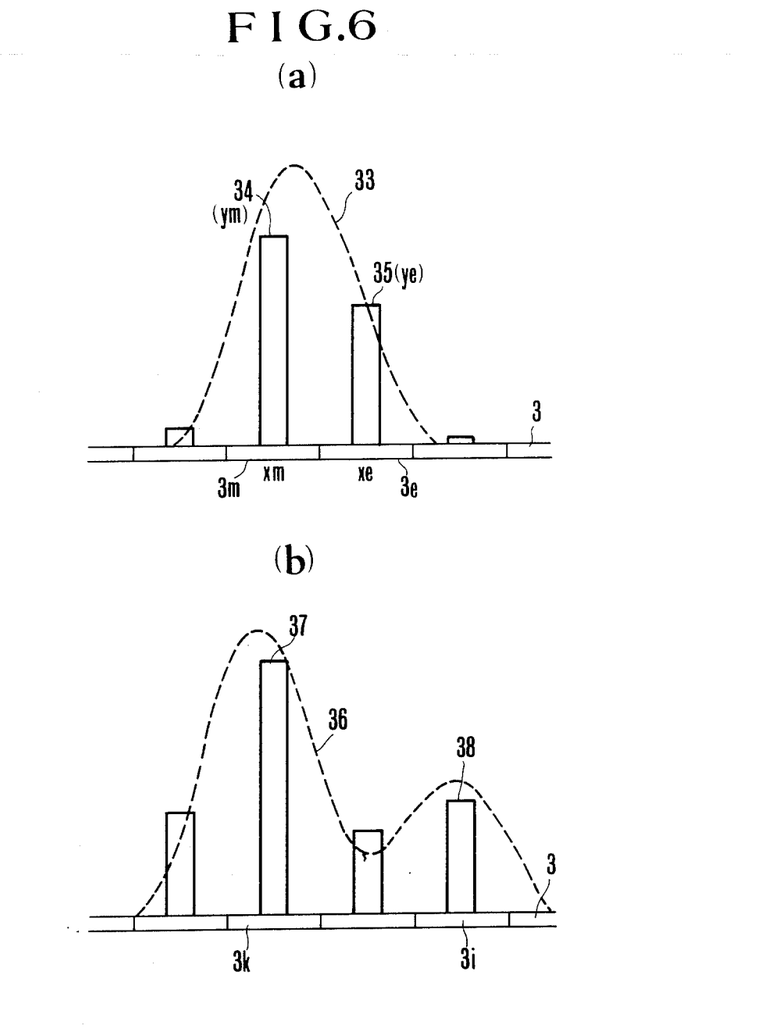

Further, in accordance with the invention, the following arrangement is also possible: Referring to FIG. 6, let us assume that the light intensity distribution 33 which is as shown in FIG. 6(a) is obtained on the light sensitive element array 3 and that the light receiving signal 43 which is the largest of the light receiving signals is expressed as ym, the next largest one 35 is y1 and the positions of the light sensitive elements which produce these signals are xm and x1. Further assuming that the location of the object is a position obtained by internally dividing it by the magnitude of the light receiving signals ym and y1, there obtains the following relation:

$$x = \frac{ymx1 + y1xm}{ym + y1} \quad (6)$$

Normally, as shown in FIG. 6(a), the signals ym and y1 are produced from two adjacent light sensitive elements 3m and 3e. However, in case where two objects located at different distances are within the visual field of distance measurement, such signals may be produced from two light sensitive elements 3k and 3i which are not adjacent to each other as shown in FIG. 6(b). Even in such a case, an appropriate result of distance measurement can be obtained between the signal 3i and 3k by the internal dividing operation of the output values.

Figure 7:
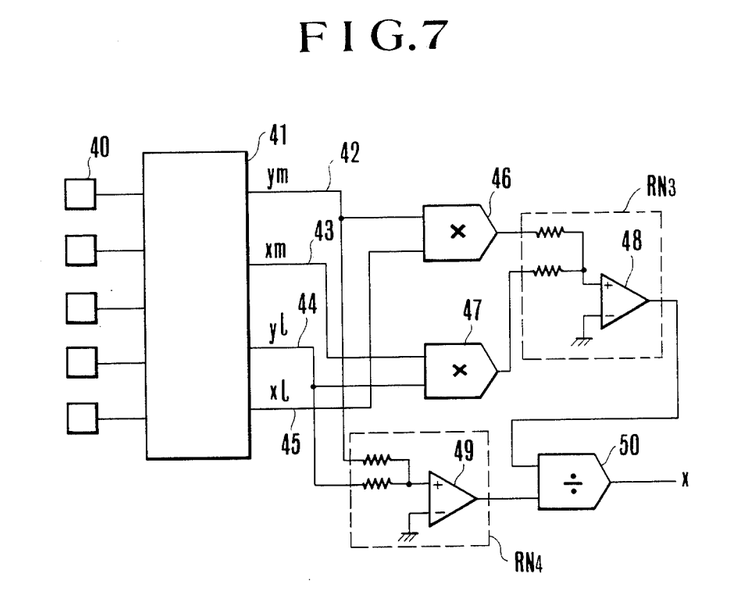
FIG. 7 is a block diagram showing a second embodiment of the invention.

FIG. 7 shows by way of example an analog computation circuit which is arranged to compute the above shown formula (6). In this arrangement, an array 40 consists of five light sensitive elements, which are arranged in parallel with each other. The outputs of the array 40 are supplied in parallel to a first and second largest value determining circuit 41. Upon receipt of the group of analog light receiving signals from the array 40, the circuit 41 discriminates them and produces to lines 42–45 a light receiving signal ym which has the largest value, a position signal xm indicative of the position of the light sensitive element which has produced the signal ym, another light receiving signal ye which has the largest value next to the light receiving signal ym and another position signal xe indicative of the position of the light sensitive element which has produced the light receiving signal ye. The signals ym and ye are supplied to a multiplier 46 while the signals ye and xm are supplied to another multiplier 47. The outputs of the multipliers 46 and 47 are added together at an addition circuit RN3 which includes an operational amplifier 49.

The output of this addition circuit RN3 represents the value of the numerator of formula (6). In the meantime, the signals ym and ye are supplied to an addition circuit RN4 which includes an operational amplifier 49. The output of the addition circuit RN4 represents the denominator of formula (6). The output of the addition circuit RN3 and that of the addition circuit RN4 are supplied to a divider 50. The divider 50 then produces a measured distance signal according to formula (6).

Figure 8:
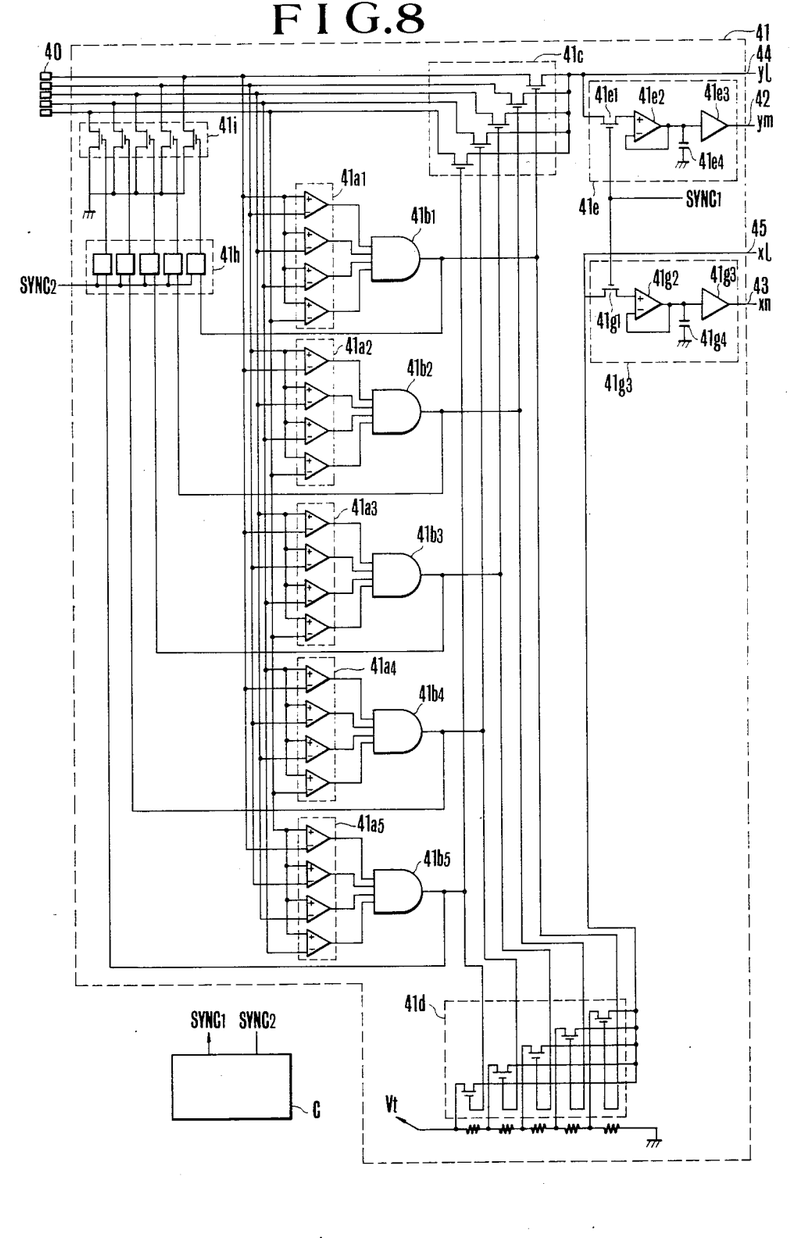
FIG. 8 is a circuit diagram showing the details of a block shown in FIG. 7.
Figure 9:
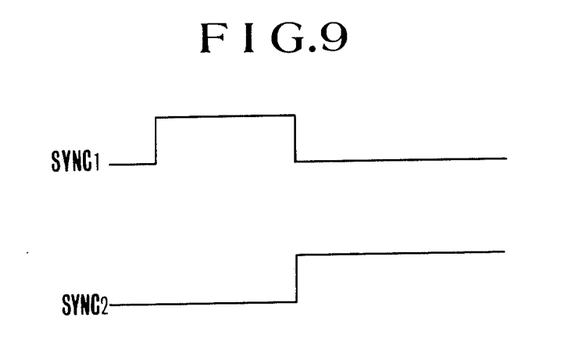
FIG. 9 is a time chart of control signals shown in FIG. 8.

The above stated first and second largest value determining circuit 41 is arranged, for example, as shown in FIG. 8. Referring to FIG. 8, the signals supplied in parallel from the array 40 of the light sensitive elements are respectively compared by comparator groups 41a1–41a5. Among the comparator groups, the comparator group which detects the signal of the largest value is detected through AND gates 41b1–41b5 because all the comparators of that group produce high level signals. The result of comparison thus performed is produced from the AND gates as an address signal. This address signal comes to operate one of an analog switch group 41c. Then, the signal ym of the largest value is produced to a circuit line 41d. This maximum value signal ym is held at a storage circuit 41e consisting of an analog switch 41e1, buffers 41e2 and 41e3 and a capacitor 41e4 and is produced to a circuit line 42. Referring now to FIG. 9, at this instant, the analog switch 41e has been rendered operative by a signal SYNC1 which is produced from a control circuit C in such a manner as shown in FIG. 9. The above stated address signal is supplied also to an analog switch group 41f. Then, the position signal xm which corresponds to the maximum value signal ym is supplied to a storage circuit 41g consisting of an analog switch 41g1, buffers 41g2 and 41g3 and a capacitor 41g4 and is produced to a circuit line 43. At this instant, the analog switch 41g1 also has been rendered operative by the signal SYNC1 from the control circuit C. Meanwhile, the above stated address signal is supplied also to a storage circuit group 41h. However, since an actuation signal SYNC2 produced from the control circuit C for the storage circuit group 41h is at a low level, the storage circuit group 41h is not actuated thereby.

After that, when the level of the signal SYNC2 becomes high as shown in FIG. 9, the storage circuit group 41h is actuated thereby to actuate in turn one of the analog switch group 41i according to the above stated address signal. With the analog switch 41i thus operated, the maximum value signal ym is killed. As a result of this, the comparator groups 41b1–41b5 produces another address signal which corresponds to the signal ye which is of the second largest value. With this address signal produced, the second largest signal ye and the position signal representative of the position of the light sensitive element which has produced the signal ye are respectively produced at circuit lines 44 and 45. Further, at that instant, the level of the signal SYNC1 has become low to render both the analog switches 41e1 and 41g1. With the analog switches 41e1 and 41g1 thus being inoperative, the signals ym and xm are left in a state of having been produced from the circuit lines 42 and 43.

In accordance with the present invention, the light pattern on the array of light sensitive elements permits the various processing methods mentioned in the foregoing description of the embodiment to be replaced with other conceivable mathematic methods. Further, the use of the methods of the present invention in combination with the conventional methods will give a highly advantageous distance measuring device. Further, it goes without saying that the computation process employed in the embodiment described in the foregoing can be carried out also by a software sequence arrangement of a micro-computer.

In the above described method according to the invention, each of the light receiving signals does not have to be in a linear relation to the quantity of light incident upon each light sensitive element. The method is usable as long as the quantity of light incident upon the light sensitive element is in a one-to-one relation to an electrical output. This invention is therefore applicable also to an arrangement wherein the light receiving signal is logarithmically suppressed for the purpose of increasing the dynamic range of the photometric circuit.

As has been described in detail, the distance measuring device according to the present invention uses a small number of light sensitive elements and efficiently utilizes the light receiving signals produced from these elements to obtain a continuous measured distance signal. Besides, in the case of a distance measuring device of the zone focus type, the number of distinguishable distance zones can be greatly increased in accordance with the invention.

The invention greatly contributes to improvement in the accuracy of a distance measuring device and particularly to improvement in the performance of a distance measuring device adapted for use in a portable optical apparatus such as a photographic camera of the automatic focusing type.

What I claim:

1. A distance measuring device which has signal generating means arranged to transmit a signal to an object the distance to which is to be measured, receives reflection signals from the object by an array of a plurality of signal receiving means and measures the distance to the object on the basis of information obtained from said signal receiving means, said device comprising:
   information detecting means for detecting information from at least two of said plurality of signal receiving means; and
   distance measuring means for continuously measuring the distance to the object on the basis of signals produced from said information detecting means;
   said distance measuring means being arranged to receive and compute signals from said information detecting means and being provided with computing means for obtaining by computation the position of a peak value of the received signals which continuously vary in the direction in which said signal receiving means are set in array;
   said distance measuring means having largest value determining means for detecting which of the signals received by said signal receiving means is of the largest value among these signals;
   said computing means including a computation circuit which computes the position x of said peak value in accordance with the following formula;

$$x = \frac{ym+1 - ym-1}{4ym - 2ym-1 - 2ym+1} \Delta x + xm$$

wherein xm represents the position of signal receiving means that has received a signal of the largest value; ym the signal value of the signal received by said signal receiving means xm; ym+1 and ym−1 signal values of signals received by signal receiving means disposed adjacent to said signal receiving means xm; and $\Delta x$ a pitch between signal receiving means and is arranged to be $\Delta x = xm+1 - xm = xm - xm-1$.

2. A distance measuring device according to claim 1, wherein said information detecting means includes position indicating means for indicating the position of the signal receiving means which has received the signal of the largest value.

3. A distance measuring device according to claim 2, wherein said computing means includes first addition means for adding together the largest value signal received by said signals receiving means and the signals received by said signal receiving means disposed adjacent to said signal receiving means that has received the largest value signal and for performing the addition with a predetermined degree of weighting.

4. A distance measuring device according to claim 3, wherein said computing means includes dividing means for dividing the output of said first addition means.

5. A distance measuring device according to claim 4, wherein said computing means includes second addition means which adds together the output of said position indicating means and the output of said dividing means.

6. A distance measuring device according to claim 5, wherein said signal receiving means includes a photoelectric converting means.

7. A distance measuring device according to claim 6, wherein said signal generating means includes light emitting means.

8. A distance measuring device which has signal generating means arranged to transmit a signal to an object the distance to which is to be measured, receives reflection signals reflected from the object by an array of a plurality of signal receiving means and measures the distance to the object on the basis of information from said signal receiving means, said device comprising:
   first largest value detecting means which detects a reflection signal of the largest value among said reflection signals received by said plurality of signal receiving means from said object;
   first position detecting means for detecting the position of the signal receiving means which has received the reflection signal of the largest value;
   second largest value detecting means which detects a reflection signal of the second largest value among said reflection signals received by said plurality of signal receiving means;
   second position detecting means for detecting the position of the signal receiving means which has received said second largest value signal; and
   distance measuring means which continuously detects a distance to said object, said distance measuring means includes computing means for continuously computing the distance on the basis of the outputs of said first and second largest value detecting means and those of said first and second position detecting means;
   said computing means including a computing circuit for computing the position of a peak value of received signals which vary in the direction in which said array of signal receiving means is arranged in a row;

said computing circuit computes the position x of said peak value according to the following formula:

$$x = \frac{ymxe + yexm}{ym + ye}$$

wherein xm represents the output of said first position detecting means; ym the output of said first largest value detecting means; xe the output of said second position detecting means; and ye the output of said second largest value detecting means.

9. A distance measuring device according to claim 8, wherein said computing means includes:
first multiplication means which multiplies the output of said first largest value detecting means by that of said second position detecting means; and
second multiplication means which multiplies the output of said second largest value detecting means by that of said first position detecting means.

10. A distance detecting device according to claim 9, wherein said computing means includes first addition means which adds up the output of said first multiplication means and that of said second multiplication means.

11. A distance detecting device according to claim 10, wherein said computing means includes second addition means which adds up the output of said first largest value detecting means and that of said second largest value detecting means.

12. A distance detecting device according to claim 11, wherein said computing means includes division means which divides the output of said first addition means by that of said second addition means.

13. A distance detecting device according to claim 12, wherein said signal receiving means includes photo-electric converting means.

14. A distance detecting device according to claim 13, wherein said signal generating means includes light emitting means.

15. A distance measuring device which has signal generating means arranged to transmit a signal to an object the distance to which is to be measured, receives reflection signals from the object with an array of a plurality of signal receiving means, and measures the distance to the object on the basis of information obtained from said signal receiving means, said device comprising:
information detecting means for detecting information from at least two of said plurality of signal receiving means; and
distance measuring means for continuously measuring the distance to the object on the basis of signals produced from said information detecting means;
said distance measuring means being arranged to receive and compute signals from said information detecting means and being provided with computing means for obtaining by computation the position of a peak value of the received signals which continuously vary in the direction in which said signal receiving means are set in array;
said distance measuring means having largest value determining means for detecting which of the signals received by said signal receiving means is of the largest value among these signals;
said information detecting means including position indicating means for indicating the position of the signal receiving means which has received the signal of the largest value; and
said computing means for adding together the largest value signal received by said signals receiving means and the signals received by said signal receiving means disposed adjacent to said signal receiving means that has received the largest value signal and for performing the addition with a predetermined degree of weighting.

16. A device as in claim 15, wherein said computing means includes dividing means for dividing the output of said first addition means.

17. A device as in claim 16, wherein said computing means includes second addition means which adds together the output of said position indicating means and the output of said dividing means.

18. A device as in claim 17, wherein said signal receiving means includes a photo-electric converting means.

19. A device as in claim 18, wherein said signal generating means includes light emitting means.

20. A distance measuring device which has signal generating means arranged to transmit a signal to an object the distance to which is to be measured, receives reflection signals reflected from the object by an array of a plurality of signal receiving means, and measures the distance to the object on the basis of information from said signal receiving means, said device comprising:
first largest value detecting means which detects a reflection signal of the largest value among said reflection signals received by said plurality of signal receiving means from said object;
first position detecting means for detecting the position of the signal receiving means which has received the reflection signal of the largest value;
second largest value detecting means which detects a reflection signal of the second largest value among said reflection signals received by said plurality of signal receiving means;
second position detecting means for detecting the position of the signal receiving means which has received said second largest value signal; and
distance measuring means which continuously detects a distance to said object, said distance measuring means includes computing means for continuously computing the distance on the basis of the outputs of said first and second largest value detecting means and those of said first and second position detecting means;
said computing means including a computing circuit for computing the position of a peak value of received signals which vary in the direction in which said array of signal receiving means is arranged in a row;
said computing means including:
first multiplication means which multiplies the output of said first largest value detecting means by that of said second position detecting means; and
second multiplication means which multiplies the output of said second largest value detecting means by that of said first position detecting means.

21. A device as in claim 20, wherein said computing means includes first addition means which adds up the output of said first multiplication means.

22. A device as in claim 21, wherein said computing means includes second addition means which adds up the output of said first largest value detecting means and that of said second largest value detecting means.

23. A distance detecting device according to claim 22, wherein said computing means includes division means which divides the output of said first addition means by that of said second addition means.

24. A distance detecting device according to claim 22, wherein said signal receiving means includes photoelectric converting means.

25. A distance detecting device according to claim 24, wherein said signal generating means includes light emitting means.

26. A distance measuring device in which a signal is projected onto an object to be measured and the distance to the object is measured on the basis of position at which the signal reflected by the object is received, comprising:

(a) signal emitting means for projecting a signal onto the object;

(b) signal receiving means for receiving the signal reflected by the object, said receiving means having a plurality of of receiving portions each of which produces an output corresponding to the intensity of the reflected signal, (c) computing means for approximating the output values of the receiving portions to a curve of the second order and calculate the peak position of the curve, said computing means producing a signal of the peak position as a signal representing the distance to the object.

27. A device according to claim 26, in which the computing means includes sampling means for sampling an output of the receiving portion in which the intensity of the reflected signal is maximum and outputs of receiving portions marginal to the receiving portion of maximum intensity to formulate the curve of the second order.

* * * * *